Oct. 15, 1968   R. J. LANYI ET AL   3,406,302
CYLINDRICAL MAGNETOSTRICTIVE ELECTROMECHANICAL TRANSDUCER
Filed March 15, 1966   3 Sheets-Sheet 1

WITNESSES:
Bernard R. Giegue
James F. Young

INVENTORS
Ronald J. Lanyi &
Richard C. Heim.
BY
D. J. Strcantiff
AGENT

Motional Impedance Curves For Basic Ring Transducer Test Sections

Motional Impedance Curves For Transducerized Test Sections With Slotted Laminations Displacement vs power - stainless steel test sections with slotted and unslotted laminations

United States Patent Office 3,406,302
Patented Oct. 15, 1968

3,406,302
**CYLINDRICAL MAGNETOSTRICTIVE ELECTRO-
MECHANICAL TRANSDUCER**
Ronald J. Lanyi and Richard C. Heim, Baltimore, Md., assignors to Westinghouse Electric Corporation, Pittsburgh, Pa., a corporation of Pennsylvania
Filed Mar. 15, 1966, Ser. No. 534,453
4 Claims. (Cl. 310—26)

The present invention relates to a cylindrical electromechanical transducer, and more particularly to such a transducer of the magnetostrictive type.

A primary object of the present invention is to provide a highly efficient, highly effective eletromechanical transducer to vibrate in a radial mode.

Another object of the present invention is to provide an efficient and effective cylindrical transducer for imparting vibrations radially inward to a fluid therein.

It is another object of the present invention to provide an alternate embodiment of the invention for imparting vibrations radially outward.

In accord with general features of the present invention, the electromechanical transducer comprises a hollow cylinder member to be vibrated radially for coupling such radial vibrations to a substance which, in one embodiment of the invention would be located within or passing through such cylinder member, and in an alternate embodiment of the invention would be at the exterior of such hollow cylinder member. In vibratory coupling with such hollow cylinder member is an array or arrays of thin annular magnetostrictive elements. In one embodiment such array of elements is disposed exteriorly of the hollow cylinder member in vibratory coupling thereto at the inner circumference of such array, while in the other embodiment, such array of annular magnetostrictive elements is in vibratory coupling at its inner periphery to the outer circumferential wall of such hollow cylinder member.

In accord with a significant feature of the invention, the mechanical coupling between the hollow cylinder member and the annular magnetostrictive elements is arrived at by use of a bonding or structural technique which minimizes creation of thermal stresses in such magnetostrictive elements which tend to destroy their effectiveness. Use of an epoxy cement has been found to be a suitable bonding technique to accomplish such purpose.

Yet another important feature of the present invention is to provide for disposition of a toroidally-wound energizing coil or coils for the array or arrays of magnetostrictive elements by provision of coil-turn-accommodating slots formed in the wall of the hollow cylinder member to which the magnetostrictive elements are bonded.

Other objects, features, and advantages of the invention will become apparent from the following more detailed description thereof when taken in connection with the accompanying drawings, in which.

Figure 3:
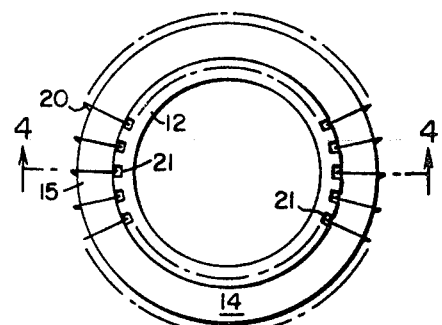
FIG. 3 is an end view of the second embodiment of the invention for producing radially-inward vibrations, constructed in accordance with the present invention.
Figure 4:
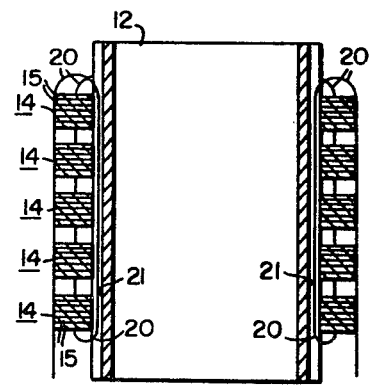
FIG. 4 is a section view taken along the line 4—4 in FIG. 3.

Referring to FIGS. 1 to 6, the novel transducer of the present invention comprises a hollow cylinder member 12 with which is associated coaxially therewith an array 14, or arrays, of mutually-abutting annular magnetostrictive elements 15 in vibratory coupling to a cylindrical surface of such hollow cylinder member. Where it is intended to impart a radial vibration at the exterior surface of the hollow cylinder member 12, the array 14 of magnetostrictive elements 15 is located interiorly of the hollow cylinder member 12 and the vibratory coupling is between the interior cylindrical surface of the cylinder member 12 and the exterior cylindrical surface of the array 14 of magnetostrictive elements as in the configuration shown in FIGS. 1 and 2 and FIGS. 5 and 6.

Where it is desired to impart a radial mode of vibration to a medium located within the hollow cylinder member 12, the array 14 of magnetostrictive elements is located exteriorly of such cylinder member and the inner cylindrical surface of such array is coupled mechanically to the outer cylindrical surface of the hollow cylinder member, as exemplified in FIGS. 3 and 4.

By suitable electromagnetic energization of the array 14, or arrays 14, of annular magnetostrictive elements 15 same are made to vibrate in a radial mode with respect to the axis of the cylinder member 12, and by virtue of the vibrative coupling, such cylinder member 12 is thereby also made to vibrate in such radial mode to impart a corresponding vibration to a material or fluid in contact with one or the other cylindrical surface of such hollow cylinder member, as the case may be; the outer surface thereof, in the embodiment shown in FIGS. 1 and 2 and 5 and 6, and at the interior cylindrical surface of such hollow cylinder member in the embodiment shown in FIGS. 3 and 4.

Figure 1:
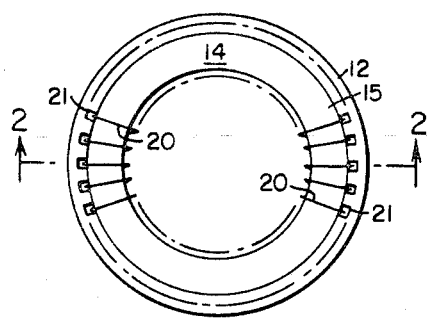
FIGURE 1 is an end view of the one embodiment of a magnetostrictive transducer for producing radially-outward vibrations, constructed in accord with the present invention.
Figure 2:
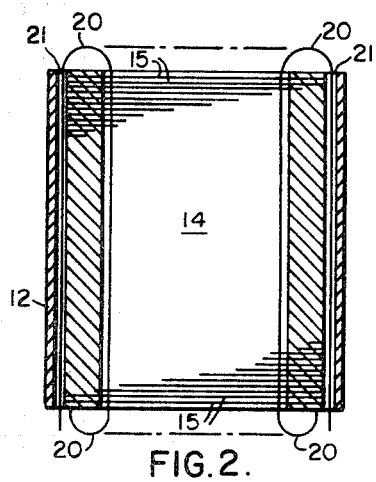
FIG. 2 is a cross sectional view taken along the line 2—2 in FIG. 1.
Figure 6:
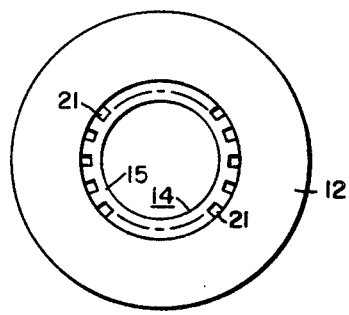
FIG. 6 is an end and section view of a transducer test section found to have less desirable operating characteristics.

In the embodiment of the type shown in FIGS. 1 and 2 wherein an array 14 of annular magnetostrictive elements 15 is disposed at the interior of a hollow cylinder member 12, an experimental embodiment was constructed of the general radial proportions shown in FIG. 6 and tested. In one case, the outer periphery of a stacked array of annular, 5-mil thick, nickel laminations was bonded to the interior surface of relatively-thick hollow cylinder member 12 of H–12 die steel by a brazing process in the steps of preplacing a thin 5-mil curved sheet of silver solder alloy between the outer surface of the stacked nickel magnetostrictive elements and the inner peripheral surface of a hollow cylinder member, covering the entire outer peripheral surface of such array, with flux applied to the prospective joint area and to the alloy sheet prior to assembly. Heat was applied by an induction heating coil encircling the outer periphery of the hollow cylinder member 12 and the temperature of the entire assemblage was raised to about 1400° F., sufficient to melt the silver solder sheet. Following this, the assemblage was allowed to cool to complete the brazed bond between the outer peripheral surface of the array 14 of magnetostrictive elements and the interior cylindrical surface of the hollow cylinder member 12. When such a transducer was subsequently energized there was absolutely no indication of vibration at any frequency regardless of the amount of DC polarization and the motional impedance curves for the system, confirmed complete lack of any mechanical resonance. The result was completely unexpected and a program was undertaken to determine the cause of such result by construction of a number of relatively short, or thin, transducers of the interior magnetostrictive array configuration such as shown in FIG. 6. In the fabrication of certain of such test sections, the outer periphery of the array of annular magnetostrictive elements was bonded to the interior surface of the hollow cylinder member by an epoxy resin in others by brazing, to establish the mechanical bond. The performance of the epoxy-bonded construction gave good vibration characteristics and an explanation was sought for the poor vibrational characteristics of the brazed transducers.

Factors accounting for such poor performance were considered to be a decrease in the apparent reversible permeability of the laminations; development of thermal stresses in the transducer during the brazing operation; adverse affect of such stress on the permeability of the nickel laminations; the adverse affect of stress on the saturation magnetostriction of such material; and the electrical impedance locus of a magnetic material extending into the frequency range where eddy current shielding occurs.

Thermal stresses develop during the brazing operation because the nickel of the magnetostrictive elements has a thermal expansion coefficient approximately 1.1 times that of the steel of which the cylinder member was composed. When the array 14 of magnetostrictive elements 15 or laminations, plus the hollow cylinder member 12 were heated to 1400° F. during the brazing operation, the laminations expanded more than the hollow cylinder member. After the brazed material melted and the assembly cooled, the braze metal solidified and rigidly joined the laminations to the cylinder member. During the remainder of the cooling period, the nickel laminations were unable to contract as much as they originally expanded during the heating operation, due to the constraint imposed by the metallurgical and mechanical bond with the cylinder member. Thus, upon obtaining room temperature, considerable tensile stresses were established in the laminations. The tensile hoop stress developed in the particular experimental embodiment was calculated to be about 21,400 p.s.i. (maximum value).

Having related the brazing of the array of magnetostrictive elements to the hollow cylinder member to the creation of a very large initial stress in the nickel laminations 15, it became apparent that the stresses have a very deleterious effect on the transducer properties of nickel. A significant decrease in permeability of nickel can be demonstrated as the material is placed in tension, both static permeability and initial permeability. Reversible permeability may be considered as varying in approximately the same manner (i.e., reversible permeability decreases with increasing tensile stress). Thus, relatively low permeability of the brazed transducer construction is attributed to thermal tensile stresses developed during the brazing operation. These stresses were significantly reduced in the epoxy-bonded constructions.

It also can be shown that the static saturation magnetostriction of nickel increases with tensile stress by a maximum factor of 1.5 and decreases to zero if sufficient compressive stress (15,000 p.s.i.) is applied. However, it can also be shown that, to take advantage of the increase in magnetostriction, considerable intrinsic magnetism must be induced in the nickel. If the permeability of nickel is relatively low, as it is in the case when tensile stresses are applied to nickel, high intrinsic magnetism can only be obtained by the application of extremely high magnetic field strength. This requirement is undesirable. As an example, if the permeability of the laminations was 3.0, the DC polarization current required to establish an intrinsic magnetization of 1,000 gauss would be 214 amperes; if the permeability of the laminations was 51, a polarization current of only 8½ amperes would be necessary to establish the same level of intrinsic magnetism. Thus, although the potential static magnetostriction of a brazed transducer may be significant, the low permeability of such arrangement prevents the establishment of adequate intrinsic magnetism for aligning the magnetic domains against the restricting thermal tensile stresses which oppose domain alignment, thus, the system is unable to vibrate.

Consideration of various alloys available for construction of a high-strength hollow cylinder member 12 for use in a roll body test for determining the effect of imparting vibration to a roll during rolling of a metal, indicated that there was no suitable material available which would match the thermal expansion curve of nickel over the brazing temperature range. In cases where the hollow cylinder member need not have such comparable strength, the development of thermal stresses during a brazing operation can be eliminated by matching the thermal expansion characteristics of the nickel laminations with that of such cylinder member or by using a cylinder of "thin" wall thickness, greatly reducing the thermal stresses in the nickel. It is therefore possible that brazing can be found to be suitable if attention is paid to prevention of stress creation.

Although analysis of the effects of stress on nickel indicated that compression would be no better than tension, a transducer was brazed into a type 304 stainless steel ring in order to confirm the analysis. The results supported this hypothesis.

Figure 5:
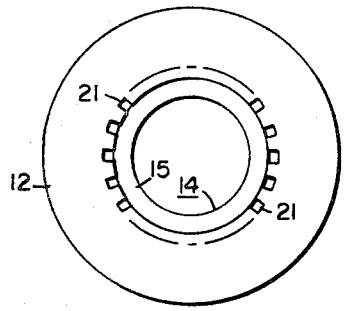
FIG. 5 is an end view of a thick-wall transducer test section constructed in accordance with the feature of the present invention.
Figure 7:
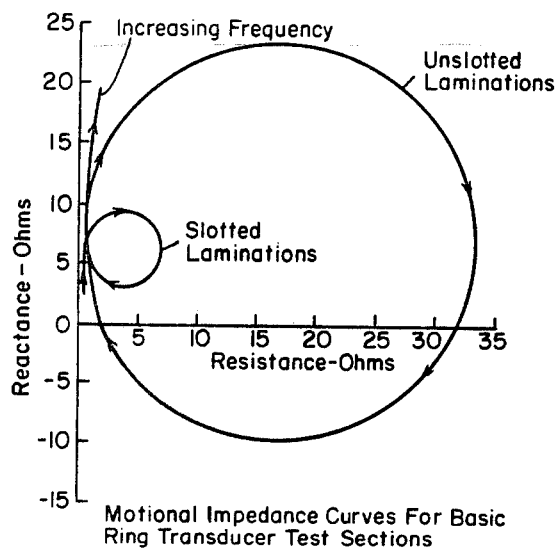
FIG. 7 illustrates low-power motional impedance curves of unslotted laminations and slotted laminations for comparison.
Figure 8:
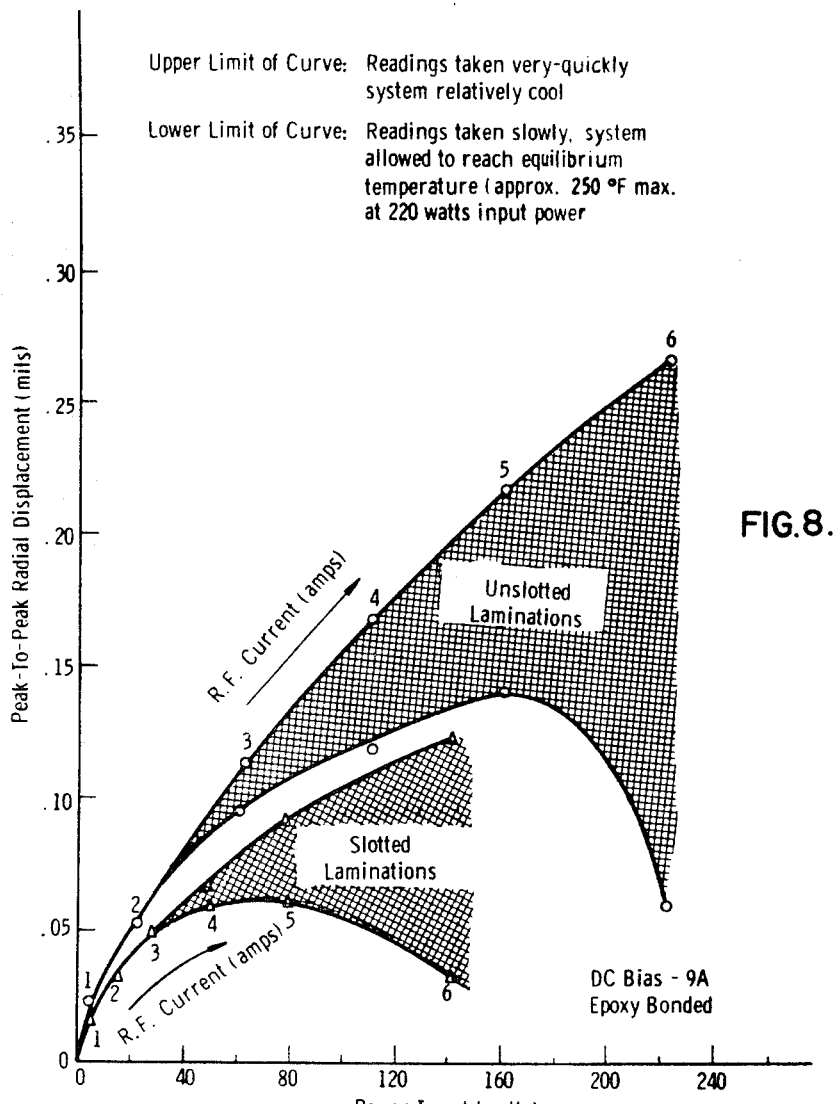
FIG. 8 illustrates the higher degree of radial vibration obtainable using the transducer configuration of FIG. 5 in comparison with FIG. 6.

In certain of the experimental test section constructions wherein the array 14 of magnetostrictive elements or laminations were disposed and bonded to the interior of the hollow cylinder member, axially-extending slots were were formed in the outer periphery of such array to provide for disposition of the turns of an energizing coil 20 toroidally wound around such array. During testing, it became apparent that such slots in the nickel laminations, such as shown for example in FIG. 6, were detracting from the performance of such experimental models. Consequently, a test section was made, such as shown in FIG. 5, in which the slots were put in the hollow cylindrical member 12 instead of in the laminations 15 as in FIG. 6. FIGS. 7, 8 and the accompanying chart set forth comparisons in performance characteristics of the respective test sections with slotted and unslotted laminations.

Based on the analysis of results of various experiments with test-section transducers, a full-size transducer was built using unslotted laminations, epoxy bonding, and a cooling system to keep the temperature of the laminations low during operation in order to avoid development of thermal stresses.

CHART.—TABULATED PERFORMANCE FACTORS—TRANSDUCERIZED TEST SECTIONS

| External cylinder | Type of lamination Slotted (S) vs. Unslotted (U) | External cylinder wall thickness (inch) | Test section | Resonant frequency $f_0$ (kc./s.) | Electro-mechanical efficiency $E_{EM}$ | Quality factor $Q = f_0/\Delta f$ | Damping factor $R_M/T^2$ (ohms$^{-1}$) |
|---|---|---|---|---|---|---|---|
| No | U | 0 | Unslotted laminations | 16.89 | .997 | 121 | .030 |
| No | S | 0 | Slotted laminations | 16.44 | .918 | 31 | .156 |
| Yes | S | ¼ | Thin wall (epoxied) | 15.22 | .899 | 45 | .238 |
| Yes | S | 1⅛ | Medium wall (epoxied) | 12.74 | .889 | 98 | .357 |
| Yes | S | 2 | Thick wall (epoxied) | 11.05 | .876 | 123 | .555 |
| Yes | S | 2 | Thick wall (brazed) | 11.28 | .112 | 113 | 12.5 |

In accord with the invention, the energizing winding 20 for the array of magnetostrictive elements is toroidally wound around the hollow cylindrical array 14 of stacked thin magnetostrictive elements 15, with the slots in the cylindrical member 12 accommodating the turns of such winding. In the configuration shown in FIG. 4, for example, where a number of arrays 14 of stacked laminations 15 are employed for acoustic impedance matching, the same winding is associated with each of the individual stacks.

With respect to avoiding development of thermal stresses in the laminations of which the array 14 of magnetostrictive elements is composed, the same considerations that were demonstrated to apply to the disposition of such array at the interior of the hollow cylinder member 12 seemingly also would apply to disposition of such array 14 on the outer periphery of such hollow cylinder member in the configuration, as shown in FIGS. 3 and 4. In accord with the teachings of the present invention, therefore, either a low temperature bond is employed to establish the vibrational coupling between the magnetostrictive elements and the hollow cylinder member, the material of which the hollow cylinder member is composed should have substantially the same thermal coefficient of expansion as that of which the magnetostrictive elements are composed to enable employment of a brazed material as the bonding agent and/or the wall thickness of the cylinder is chosen to eliminate development of *excessive* thermal stresses in the laminations.

Figure 9:
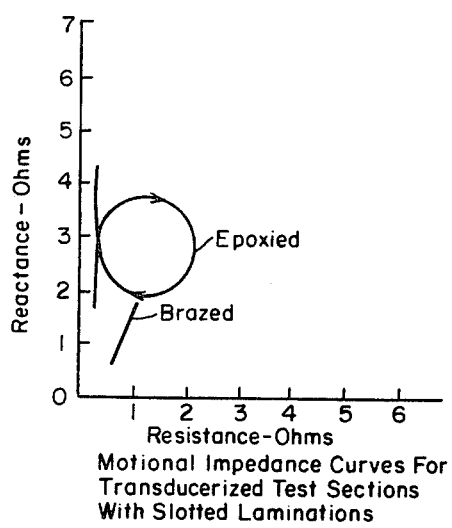
FIG. 9 includes low-power motional impedance curves for transducer test sections of FIG. 6 configuration, comparing the effect of lamination/cylinder bonding techniques.

Results of tests on the interior type of magnetostrictive array in which all laminations were epoxied to the inner surface of hollow cylinder members of different thicknesses are set forth in the performance chart. FIG. 9 and such chart also include the relative performance characteristics of a particular thick wall transducer brazed to the outer surface of the array of magnetostrictive elements; such thick wall cylinder member being of a material having a substantially different coefficient of expansion than that of the magnetostrictive elements.

FIG. 8 shows radial displacement curves for operable transducers, one of which employed slotted laminations slotted at their outer periphery as compared with unslotted laminations in which the slots for accommodating the energizing coil turns were provided in the interior surface of the hollow cylinder member. Significant is the difference in the maximum obtainable radial displacement for the two different designs.

The difference in the motional impedance curves of FIG. 7 can be attributed to an additional damping factor contributed by the extending tabs of the slotted laminations bonded to the interior surface of the hollow cylinder member 12 which cannot be magnetized due to the air gap between adjacent tabs; therefore, when the system becomes mechanically resonant, the tabs act as a restraint on the magnetostrictive circumferential expansion of the inner part of the ring, directly under the tabs, thereby mechanically damping the vibrating system.

The results of various test section transducers are shown in the performance chart. This chart and FIGS. 8 and 9 demonstrate that, in accord with the invention, a superior magnetostrictive transducer for vibrating a radial mode can result when the array of magnetostrictive lamination elements is bonded to the surface of a hollow cylinder member in a manner free of thermal stresses, and the laminations are not slotted at edges to accommodate disposition of a toroidally wound energizing coil. Furthermore, the performance improves as the thickness of the wall of the hollow cylinder member is reduced. In the experimental models constructed and tested, all laminations were made of nickel, 5 mils thick. In all cases, they were tightly stacked in mutually abutting relationship. However, the spaced-apart lamination concept as set forth in U.S. Patent 3,161,792 of E. B. Wright issued Dec. 15, 1964, seemingly could be employed in lieu of the tight-stack laminations exemplified herein.

Having now described the invention, we claim:

1. An electromechanical transducer comprising a hollow cylinder member for vibration in a radial mode and having inner and outer cylindrical surfaces, one of which is for exposure to a medium to be vibrated; a hollow cylindrical array of thin slot-free annular magnetostrictive elements arranged coaxially with said cylinder member and each having a circumferential edge in vibrative coupling to the other of the aforesaid cylindrical surfaces of the hollow cylinder member; said hollow cylinder member having longitudinally-extending grooves formed in the cylindrical surface thereof to which the magnetostrictive elements are coupled; and an energizing coil toroidally wound around said array, disposition of the turns of which coil being accommodated by the grooves in said cylinder member.

2. The electromechanical transducer of claim 1, wherein the vibrative coupling is established by a low-thermal-requirement bonding agent.

3. The electromechanical transducer of claim 1, wherein the cylinder member has thermal expansion properties so related to those of the magnetostrictive elements as to prevent creation of any significant amount of thermal stress in such elements in the presence of temperature variations experienced simultaneously by both the cylinder member and the magnetostrictive elements.

4. The electromechanical transducer of claim 1, wherein the array of magnetostrictive elements consists of a stack of mutually-abutting annular-shaped nickel elements each about 5 mils thick.

References Cited

UNITED STATES PATENTS

| 2,521,136 | 9/1950 | Thuras | 340—11 X |
| 2,749,532 | 6/1956 | Harris | 340—11 |
| 2,879,496 | 3/1959 | Camp | 310—26 X |
| 3,009,131 | 11/1961 | Woodworth | 310—26 X |
| 3,059,217 | 10/1962 | Boswell | 310—26 X |
| 3,161,792 | 12/1964 | Wright | 310—26 |

FOREIGN PATENTS

| 684,486 | 12/1952 | Great Britain. |

MILTON O. HIRSHFIELD, *Primary Examiner.*

D. F. DUGGAN, *Assistant Examiner.*